March 24, 1964  G. K. PORTER, JR  3,125,879
FLOW RATE CALIBRATION

Filed March 7, 1960  3 Sheets-Sheet 1

INVENTOR.
George K. Porter, Jr.
BY
Frank H. Borden
atty.

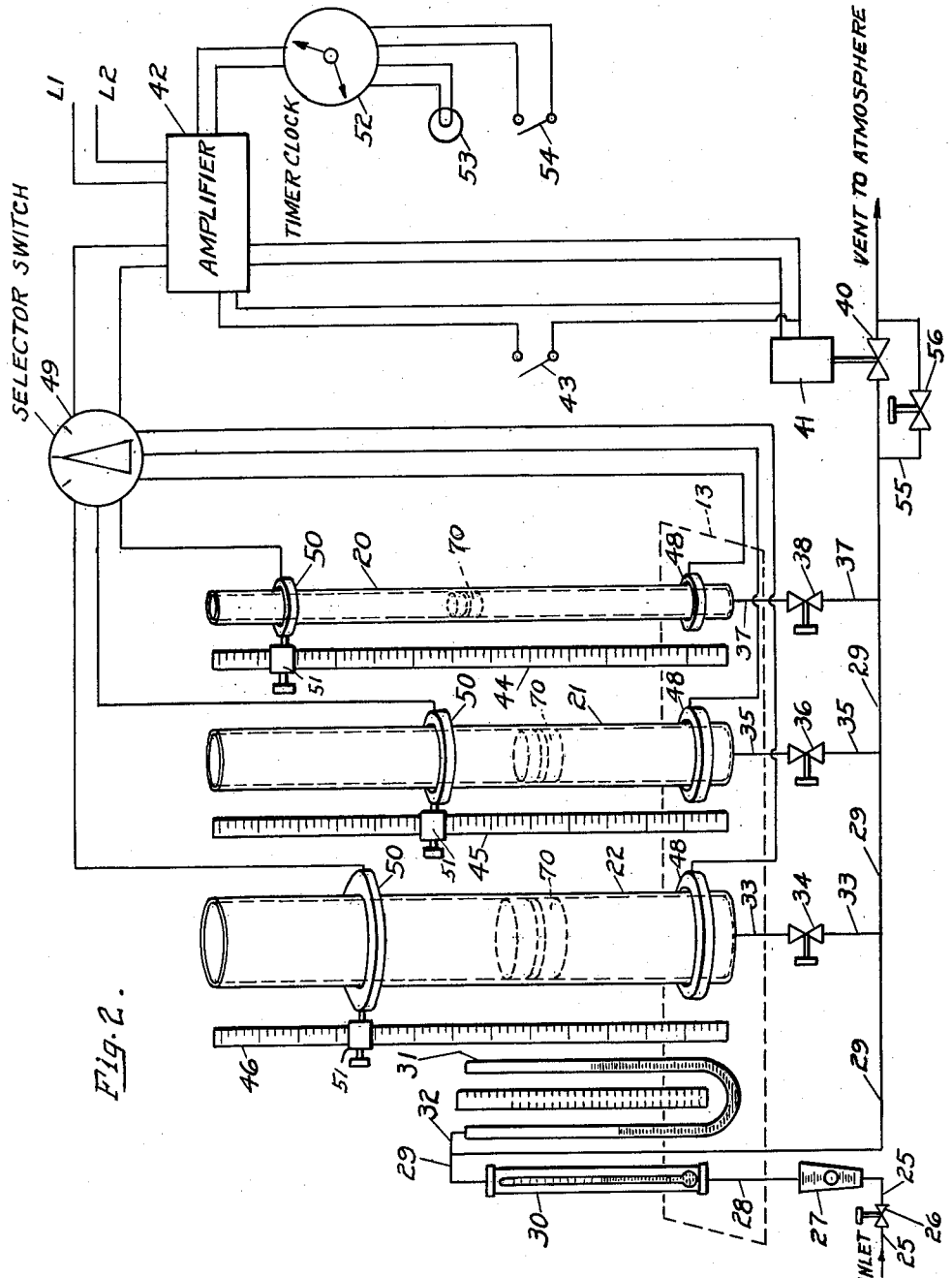

March 24, 1964  G. K. PORTER, JR  3,125,879
FLOW RATE CALIBRATION
Filed March 7, 1960  3 Sheets-Sheet 3

INVENTOR.
George K. Porter. Jr.
BY
Frank H. Borden
atty.

United States Patent Office 3,125,879
Patented Mar. 24, 1964

3,125,879
FLOW RATE CALIBRATION
George K. Porter, Jr., Sellersville, Pa.
(Grissom Place, Maple Glen, Pa.)
Filed Mar. 7, 1960, Ser. No. 13,109
18 Claims. (Cl. 73—3)

This invention relates to flow rate calibration.

In my application Serial No. 757,799, filed August 28, 1958, now issued as Patent No. 2,927,829, of March 8, 1960 there was disclosed a pneumatic float and enclosing cylinder with a ring of liquid between the float and the cylinder effecting a slidable piston combining optimum anti-friction with a hermetic seal for gases. Preferably the ring of liquid was mercury.

In calibrating gas flow meters, say of the rotameter type, it is essential to accurately determine the rates of flow at each point on the range of flows. The rate of flow is a function of the volume over the time, as modified by the temperature and pressure of the instant gas flow. The varying viscosity factors in various gas flows is solved by calibrating an instrument for a specific gas at its various temperatures.

It is among the objects of this invention: to improve the calibration of gas flow devices; to improve the invention shown in said application; to provide a flow circuit through a flow metering device into a cylinder having a piston as disclosed in said application, with electrical sensing means responsive to liquid ring position for signalling the time function of delivery of a predetermined volume of gas into said cylinder; to utilize the liquid seal of a piston mounting a ring thereof for hermetic sealing in a cylinder as a conductive mass for actuating sensing proximity signalling means; to utilize the conductive or the reflective properties of a piston sealing ring of mercury for actuating proximity signalling means; to utilize a mercury ring-sealed piston slidable in a cylinder of known volumetric capacity for timing the motion of the piston between predetermined start and stop position, as a function of the flow rate of gas imposed on such piston in such cylinder; to provide a calibrating stand with a plurality of cylinder and piston units of relatively different capacities, with valves for selecting a given cylinder appropriate for the volume of gas then flowing, to determine the instant flow rate; to provide a calibrating instrument for flow devices utilizing a cylinder and an anti-friction hermetically sealed piston slidable therein, with means for imposing flowing gas against the piston in the cylinder, with signal elements responsive to piston movements indicating respectively the zero start of piston movement and movement of the piston relative to a stop position spaced predeterminedly from the start position, with timing means starting and stopping with said respective signals to measure the time interval of piston movement as a function of rate of flow; to associate with the mechanism just described an electrically operated valve to exhaust the gas beneath the piston in the cylinder to facilitate fast return of the piston to or beyond zero datum; and other objects and advantages will become more apparent as the description proceeds.

In the accompanying drawings forming part of this description:

FIG. 2 represents a purely schematic diagram of the calibrating organization as partially shown physically in FIG. 1, including an illustrative wiring diagram of the system.

FIG. 4 represents a fragmentary vertical section through one of the cylinders or columns of the calibrating stand, showing a purely illustrative sealing seat at the lower end, and its communication with a gas flow delivering conduit, indicating its susceptibility to upward removal and downward replacement.

Figure 1:
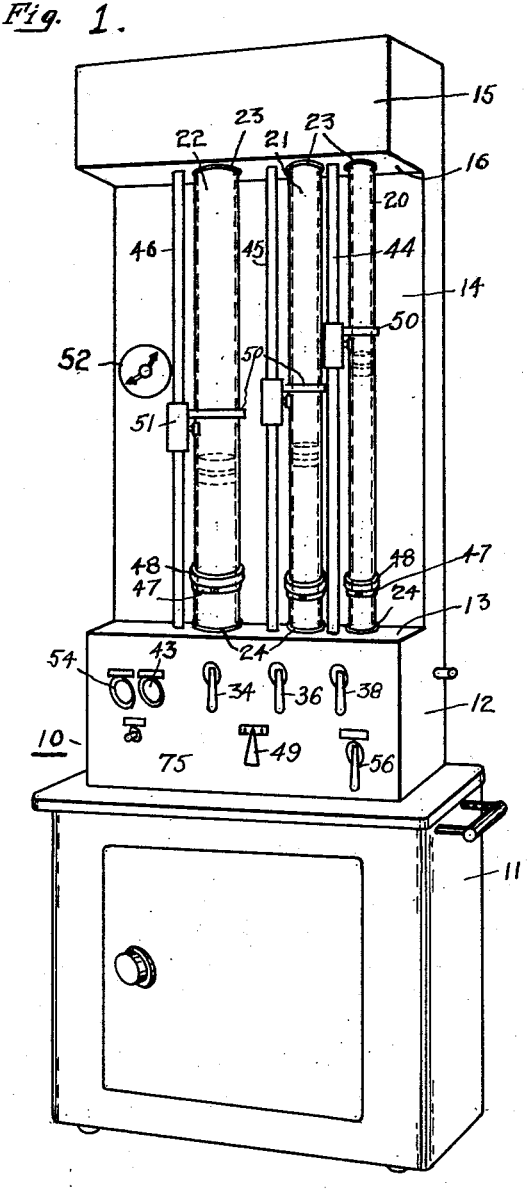
FIG. 1 represents a perspective view of an illustrative calibrating stand, according to the invention.
Figure 5:
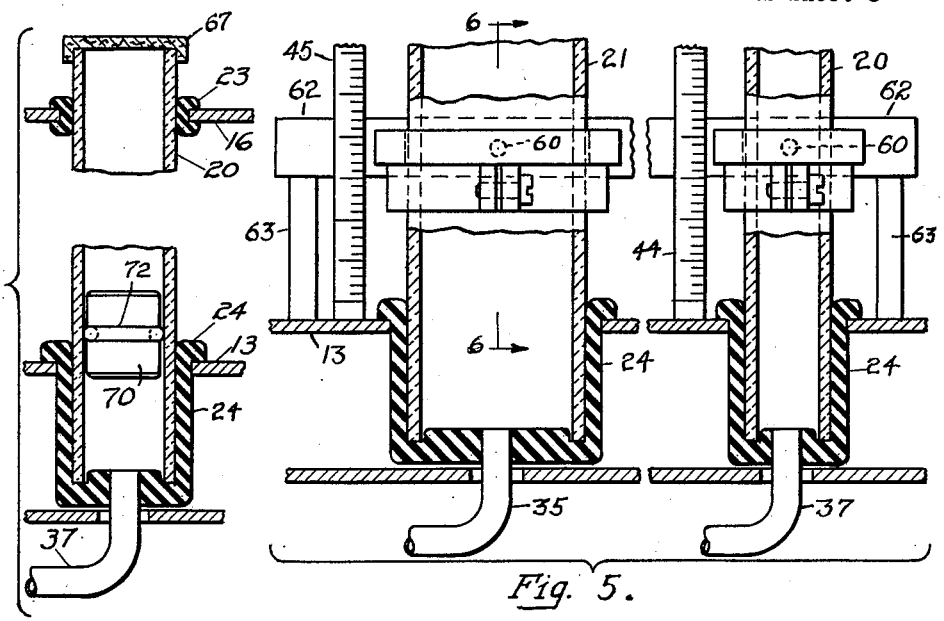
FIG. 5 represents a fragmentary section through a portion of the table of FIG. 1, showing an illustrative removable zeroing gauge by which the once-established zero setting of the lower or start proximity sensing signalling unit can be exactly reestablished after replacement of a column or cylinder.
Figure 7:
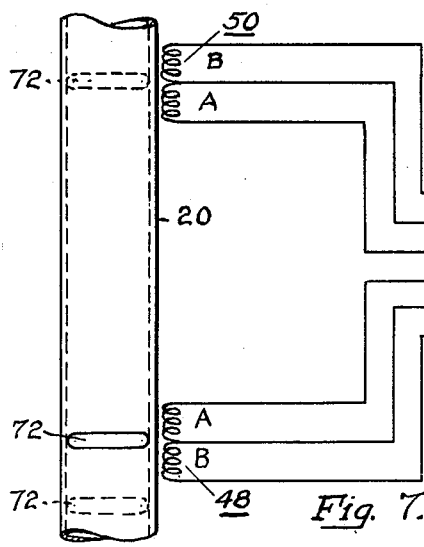

FIG. 7 represents diagrammatically a column or cylinder, as shown in FIGS. 1 and 2, with two illustrative proximity sensing signalling units juxtaposed to and in spaced relation along the column and supplying the amplifier of the organization, with the mercury ring of the piston shown in successive stages of vertical upward travel with the piston in the column, respectively, in dotted lines below and in inoperative relation to the lower start zero proximity signal unit, in full lines in operative juxtaposition to said lower unit, and in dotted lines in operative juxtaposition to the upper signalling unit, wherein the conducting properties of the mercury ring are utilized for operating the signalling units.

Figure 8:
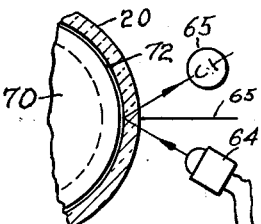

FIG. 8 represents a fragmentary diagrammatic section through a column or cylinder, with a sensing signalling unit utilizing the light reflective properties of the sealing ring of the piston for signalling the proximity of said ring to said signalling unit.

As shown in FIGS. 1 and 2, the calibrating organization comprises an illustrative three of the cylinder and piston combinations, each referred to as a column. Each is of different volumetric capacity from the others so as to calibrate a wide range of gas flow rates with efficiency and accuracy. In an illustrative organization of calibration stand, using three columns, rates of flow can be measured of from an illustrative five cc. per minute up to and including an illustrative five thousand cc. per minute. When a single column alone is used, as of course is contemplated, a purely illustrative range may extend from one cc. to one hundred cc. per minute.

Figure 3:
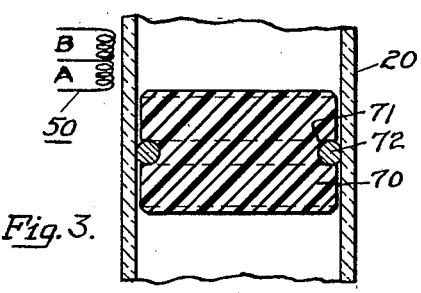
FIG. 3 represents a fragmentary section through a cylinder and piston organization substantially in accordance with the invention of said application, with an illustrative proximity coil juxtaposed to the cylinder to signal the critical juxtaposition of the mercury ring thereto when attained with upward movement of the piston.
Figure 6:
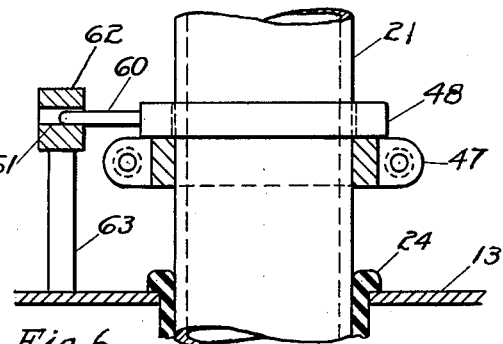
FIG. 6 represents a fragmentary section taken on line 6—6 of FIG. 5.

In the illustrative embodiment of FIG. 1, a stand 10 is provided, comprising a cabinet base 11, on which is mounted a lower stand unit 12, having a horizontal shelf presenting an upper surface 13, and merging at the rear of the assembly into the vertically upstanding rear wall 14, normal to the upper surface 13, with wall 14, at the upper end, merging into the forwardly enlarged upper member 15. The latter comprises a lower shelf having a downwardly presenting horizontal sufrace 16, parallel to but vertically spaced above the upwardly presenting surface 13. The respective shelves have apertures in respective vertical alignment to receive and mount columns. An illustrative three columns are mounted on the stand, comprising column 20, of relatively small bore, column 21, of a relatively intermediate bore, and column 22, of relatively large bore. Each glass cylinder or column, represented for purely illustrative instance by cylinder 20, in FIGS. 3, 4 and 7, is guidable downwardly through the upper member 15 and through the appropriate aperture in the shelf having lower surface 16, in gasket 23 thereof, and the lower end is seated in sealed engagement with a suitable gasket 24 in the lower shelf having surface 13. As shown in FIG. 2 each stand also mounts a thermometer 30 and a pressure gauge such as a manometer 31.

Referring to the purely schematic disclosure of FIG. 2, an inlet conduit 25 is provided for supplying the gas flow to be measured. This is controlled by a variable supply valve 26 under the control of the operator for effecting various flow rates. The discharge end of valve 26 discharges into a flow meter 27, to be calibrated, and which, illustratively, may be a form of rotameter. The discharge from the flow meter 27 is through a conduit 28 into the lower end of the total immersion type of thermometer 30. The outlet of the immersion thermometer is into a main supply conduit 29. The latter has a spur leg 32 communicating in sealed relation with one leg of the manometer 31, the other leg of which is open to the atmosphere, either directly, or through tubing (not shown). The main supply conduit 29 communicates successively with respective column conduits and quick action manually controlled valves as follows: conduit 33, having valve 34 leading in sealed relation to the lower end of column 22; conduit 35, having valve 36, leading in sealed relation to the lower end of column 21, and conduit 37, having valve 38, leading in sealed relation to the lower end of column 20. Conduit 29 may have a spur or shunt connection 55 leading to quick action manual valve 56, the outlet of which is to atmosphere for quick manual release of pressure in any column communicating with conduit 29. Conduit 29 terminates in a solenoid operated valve 40, the outlet of which is to atmosphere. The solenoid 41 controlling valve 40 is controlled in opening and closing movements by the amplifier 42. For convenience an amplifier over-ride switch 43 is provided, for manual control of the solenoid 41 independent of the amplifier 42.

Direct-reading scales 44, 45 and 46 rigidly secured to the shelves having the generally horizontal confronting surfaces 13 and 16, are disposed adjacent and parallel to the respective columns. Preferably the scales are graduated in cubic centimeters.

A lower proximity electrical sensing and signalling, zero or start, unit 48 is juxtaposed to or surrounds each column. Preferably all start units 48 are in horizontal alignment in a plane coincident with a datum graduation of scales 44, 45 and 46. An upper proximity electrical sensing and signalling, stop unit 50, is juxtaposed to or surrounds each column, in axially spaced relation to the respective start units 48. In the illustrative disclosure clamp stops 47 are removably and adjustably mounted directly on the respective columns toward the lower ends thereof, upon which the respective start units 48 rest and are maintained in the predetermined datum relation to the respective scales. The upper stop units 50, illusratively are supported by respective adjustable clamps 51, anchored at a selected graduation to the respective scales of the direct reading scales 44, 45 and 46. As indicated in FIG. 2 the respective lower and upper sensing and signalling units, 48 and 50, of any given column are coupled exclusively to the amplier 42 by a selector switch 49. Thus, selectively, any column is solely coupled to the amplifier. The latter is supplied by line voltage, and controls the start and stop of the accurate timer 52. Preferably a pilot light, or like signal 53 is associated with the power lines L1 and L2, or with the timer circuit to indicate power "on" or "off." A manual timer resetting switch 54 is provided for electrically returning the timer to zero. If desired a manual lever may be provided on the timer itself for resetting the timer.

The precision bore glass tube 20 in the usual case is energy conductive and contains slidable piston 70 having a peripheral groove 71, and a ring of liquid 72, preferably mercury, is anchored by the groove and contacts the inner surface of the tube, slightly wetting same. All columns are alike, except as to internal diameter. This effects optimum anti-friction and hermetic sealing between the piston and cylinder so that gas pressure against the lower face of the piston in the cylinder causes the piston to rise in the cylinder. The piston has another important attribute comprised in the fact that the mercury ring constitutes a conductive mass, which is symmetrical of the axis and is located immediately adjacent to the inner surface of the cylinder. The diametric plane substantially coincident with the center of the mercury ring is at a known distance from the end face of the piston, and furnishes a concentrated mass for accurate electric signalling.

The sensing and signalling zero or start units 48 and stop units 50 are proximity units automatically electrically triggering signals with predetermined juxtaposition of a mercury ring to either unit on a column. Proximity units 48 and 50 may be of any sort that, with the amplifier 42, automatically electrically start and stop the timer 52. Illustratively these respective units may comprise inducted coils, or the circuit which the units complete or control may be inductive-capacitive or the like. With the concentrated ring of mercury the signals are accurate and precise. For illustrative purposes units 48 and 50 are inductively coupled coils, comprising a primary A and a secondary B, as will be clear.

It will be seen however that the unique ring of liquid, 72, in the columns, in its contact with the inner surface of the glass cylinder is physically highly reflective of light, in contrast to the float or piston. As shown in FIG. 8, the respective proximity units may comprise photoelectric devices and the unit illustratively comprises an angularly inclined light or radiation source 64, an opaque shield 65' besides same, and a phototube 65 on the other side of the shield from the light source. The arrangement is such that stray light from the source 64 cannot pass directly to the phototube, but the beam has an angle of incidence against the mercury ring and an angle of reflection therefrom and incident on the phototube, which included angle is bisected by the shield.

It will be understood that the setting or location of the lower or start sensing and signalling unit 48 to establish true zero is critical, and the unit is anchored after setting at a zero datum. On the other hand the upper stop sensing and signalling unit 50 of each column, is adjustable along the instant scale upon which it is supported to establish the accurate volumetric displacement of the piston for which the time is to be established to determine the flow rate. When the zero setting of the start signal unit 48 is established, as at the factory, it is essential for accuracy that this setting be retained for all future uses, despite temporary disturbances therein, if any, as incident to removal of the glass cylinder, as for cleaning (which sometimes may become necessary), or for replacement, in the case of mounting units 48 directly on the respective columns. To this and each lower start unit 48 has a predetermined relation to a removable, or fixed, zeroing gauge 62. Each unit 48 illustratively mounts a radially extending pin 60, or the like, which is accurately and snugly receivable in a bore 61 in a zeroing gauge 62, mounted on legs 63 of established length. As disclosed the legs 63 rest on surface 13 and locate the start units with a generally removable tool. The lengths of the legs may vary between instruments. It will be understood that the legs 63 may be horizontal and anchor in surface 14, and the gauge 62 may be a permanent support for the start units 48, obviating the clamp stops 47. In any case the zeroing gauge 62 is positioned in a given fixed spacing from the surface 13.

It will be understood that the upper ends of the columns 20, 21 and 22 communicate with the atmosphere. To assist in maintaining the inner surfaces of the columns free from dust and dirt it is preferred to cap each column with a removable porous filter element 67. Additionally a removable dust cover (not shown) is mounted on upper element 15.

For convenience and by preference the front face 75 of the lower stand unit 12 comprises an instrument panel, mounting the various controls previously described, in convenient access to the operator.

In order to properly use the system the back pressure incident to the weight of the pistons must be accounted for. With the manometer zeroed at equilibrium, with zero on the miniscus of both legs, the back pressure incident to the weight of the given piston is read as the distance by which the left hand leg miniscus falls. This is calibrated against the actual manometer reading when exposed to the pressure of the flow, the rate of which is to be ascertained.

With the calibrator organized substantially as shown in FIG. 2, with all of the zero or start and electrical stop proximity signalling units properly disposed and coupled, and the amplifier 42 energized, all of the valves except solenoid operated valve 40 are closed, the pistons have all sunk to the lower ends of the respective columns, the clock or timer 52 is at zero. At this time the variable valve 26 is opened to some degree, and gas under pressure flows through the flow meter and about the centigrade thermometer 30, to establish the instant temperature of the flowing gas, and the gas flows through conduit 29 to exhaust through valve 40. At this juncture, as a function of fluid flow, the indicator of the flow meter 27 will have attained a position in the flow meter representative of a given but then unknown flow rate. It is desired to accurately calibrate the flow meter for this flow rate.

According to the estimated flow rate at this juncture, a given valve, of the series of valves 34, 36 and 38, is opened to admit gas pressure to the interior of the associated column for accumulation beneath the instant piston 70.

After the opening of the selected valve, the solenoid valve 40 is closed by actuation of the switch 43. This starts the actual piston movement of the selected column. The instant piston starts to rise until with predetermined proximity thereof to the zero or start unit 48 the latter is triggered. The signal thereof, through the amplifier 42 starts the running of the clock or timer 52, and couples the solenoid 41 into the circuit controlled by the stop proximity unit 50. When sufficient gas has accumulated beneath the piston of the selected column as to move same to the upward position at which the mercury ring triggers the upper proximity unit 50, the signal of the latter through the amplifier 42, stops the timer 52 and energizes solenoid 41, opening the valve 40 and venting the gas pressure to atmosphere, permitting the piston of the instant column to drop gravitationally into its lowered position in the instant column, preparatory to the next gas measurement. While recording the elapsed time for the accumulation of a predetermined volume of gas beneath the piston of the selected column, the temperature of the flowing gas has been ascertained from the thermometer 30, and the corrected pressure has been ascertained from the manometer 31. The volumn of flowing gas in the instant column between start and stop of the piston thereof being known and predetermined by the positional setting of the stop unit 50, and the time of piston movement between these limits being ascertained by the timer or clock 52, with temperature and pressure corrections the flow rate at the established setting of the flow meter is established and a suitable indication thereof is applied to the flow meter 27. Different flow rates through the flow meter will be similarly recorded or indicated.

The advantages of the invention will be manifest, as will the fact that various changes may be made in the system or its components without departing from the spirit of the invention as recited in the appended claims.

I claim as my invention:

1. Apparatus for calibrating a gas flow meter comprising a linear cylinder one end of which communicates with the atmosphere, a free piston slidable in the cylinder below said end, means external of said cylinder measuring the time of travel of said piston from a datum to a predetermined point as a function of rate of flow of gas incident on said piston in said cylinder, and means conducting gas and in communication with such flow meter and said cylinder only on the side of said piston.

2. Apparatus for calibrating a gas flow meter as in claim 1, in which said piston travel is variable by relative axial displacements of said predetermined point and said datum on said cylinder.

3. Apparatus for calibrating a gas flow meter, comprising a conduit system including a gas flow meter to be calibrated, a vertical linear cylinder the upper end of which is in communication with atmosphere and the lower end of which is in communication with said conduit system, a free piston slidable vertically in said cylinder, said conduit system conveying gas from said flow meter to the lower end of said cylinder beneath said piston, and means measuring the time required for said piston to travel vertically from a datum lower position in said cylinder to a predetermined upward point as a function of the rate of flow through said flow meter.

4. Apparatus as in claim 3, and venting means operated synchronously with attainment by said piston of said predetermined upward point relieving the gas pressure beneath said piston whereby the latter returns gravitationally toward said datum point.

5. Apparatus of the class described, comprising a cylinder, a piston slidable in said cylinder, a ring of mercury between said piston and said cylinder establishing an anti-friction hermetic seal of the piston in the cylinder, means exposing said piston to differential gas pressures so that it moves axially of said cylinder and electrical sensing signal means juxtaposed to said cylinder externally thereof and responsive to the adjacency of said ring signalling a given position of said piston in said cylinder.

6. Apparatus of the class described, comprising a cylinder, a piston slidable in said cylinder, a ring of mercury between said piston and said cylinder establishing an anti-friction hermetic seal of the piston in the cylinder, means exposing said piston to differential gas pressures so that it moves axially of said cylinder, and electrical sensing signal means juxtaposed to said cylinder and responsive to the adjacency of said ring signalling a given position of said piston in said cylinder, in which the cylinder is energy conductive and said ring is reflective and the sensing signal means is responsive to radiant energy reflection from said ring.

7. Apparatus of the class described, comprising a cylinder, a piston slidable in said cylinder, a ring of mercury between said piston and said cylinder establishing an anti-friction hermetic seal of the piston in the cylinder, means exposing said piston to differential gas pressures so that it moves axially of the cylinder, and electrical sensing signal means juxtaposed to said cylinder externally thereof and responsive to the adjacency of said ring signalling a given position of said piston in said cylinder in which said cylinder is energy conductive and said sensing signal means responds in signal to the proximity of a conducting mass, and in which said ring of mercury comprises such conducting mass.

8. Apparatus for calibrating gas flow meters, comprising a substantially vertical cylinder, a piston slidable in the cylinder, a ring of mercury between the piston and the cylinder establishing an anti-friction hermetic seal of the piston in the cylinder, a start electrical sensing signalling means juxtaposed to said cylinder externally thereof, a stop electrical sensing signalling means juxtaposed to said cylinder externally thereof in spaced relation to said start electrical sensing signalling means axially of the cylinder, said respective sensing signalling means responsive to the proximity of said ring to either of said sensing signalling means and respectively signalling successive positions of said piston in said cylinder in a continuous sliding movement of said piston transverse of said respective sensing signalling means, timing means controlled between start and stop by said respective sensing signalling means and indicating the elapsed time of the said continuous piston movement, and means supplying gas under pressure beneath said piston in said cylinder.

9. Apparatus for calibrating gas flow meters, comprising a substantially vertical cylinder, a piston slidable in the cylinder, a ring of mercury between the piston and cylinder establishing an anti-friction hermetic seal of the piston in the cylinder, a start electrical sensing signalling means juxtaposed to said cylinder externally thereof, a stop electrical sensing signalling means juxtaposed to said cylinder externally thereof, in spaced relation to said start sensing signalling means axially of the cylinder, said respective sensing signalling means responsive to the proximity of said ring to either of said sensing signalling means and respectively signalling successive positions of said piston in said cylinder in a continuous sliding movement of said piston transverse of said respective sensing signalling means, timing means controlled between start and stop by said respective sensing signalling means and indicating the elapsed time of the said continuous piston movement, and means supplying gas under pressure beneath said piston in said cylinder, and means actuated by said stop sensing signalling means venting the gas pressure beneath said piston whereby the latter drops gravitationally to adjacency to said start sensing signalling means.

10. Apparatus for calibrating gas flow meters comprising a cylinder generally vertical of known internal diameter, a piston slidable in said cylinder, a ring of mercury between the piston and cylinder establishing an anti-friction hermetic seal of the piston in said cylinder, a start electrical sensing signalling means juxtaposed externally to said cylinder toward the lower end thereof, a stop electrical sensing signalling means juxtaposed externally to said cylinder in spaced relation to said start sensing signalling means axially of the cylinder, said respective sensing signalling means reacting functionally with predetermined axial locations of said mercury ring in said cylinder, means admitting gas under pressure through a flow meter element into said cylinder beneath said piston effecting a continuous uniform axial sliding movement of said piston with relation to said respective start and stop electrical sensing signalling means, timing means controlled by said respective sensing signalling means measuring the time required for the piston to move from the start to the stop sensing signalling means as a function of gas flow rate of the flow incident on said piston across such flow meter element.

11. Apparatus as in claim 10, and a second cylinder of different internal diameter from said known internal diameter, a second piston in said second cylinder, a second ring of mercury between said second piston and said second cylinder, a second electrical start sensing signalling means juxtaposed externally to said second cylinder, a second electrical stop sensing signalling means juxtaposed externally to said second cylinder in axial spacing from said second start sensing signalling means, means selectively operated admitting gas under pressure from such flow meter exclusively into said second cylinder beneath said second piston, said timing means being common to both said first and second electrical start and stop sensing signalling means, and means selectively rendering said timing means exclusively responsive to said second start and stop sensing signalling means.

12. Apparatus of the class described, comprising a cylinder, means mounting the cylinder in a fixed substantially vertical position, a piston in substantially hermetically sealed relation to and slidable in the cylinder, scale means mounted in general parallelism with said cylinder, start sensing electrical signal control means juxtaposed externally to said cylinder, stop sensing electrical signal control means juxtaposed externally to said cylinder, said respective sensing electrical signal control means being complemental to said piston and actuated as a function of predetermined positioning thereof, means adjustably mounting said stop sensing electrical signal control means relative to said scale means establishing a predetermined axial setting thereof relative to said cylinder, adjustable means separate from said start sensing electrical signal control means mounted on said cylinder in predetermined relation to said scale means and supporting said start sensing electrical signal control means at a datum, means exposing said piston to differential gas pressures in such sense that the piston moves in the cylinder from said start sensing electrical signal control means to the said stop sensing electrical signal control means as a continuous movement.

13. Apparatus as in claim 12 in which both start and stop sensing electrical signal control means comprise annular members surrounding said cylinder.

14. Apparatus as in claim 12 in which the said adjustable means comprises a clamp frictionally engaging said cylinder.

15. Apparatus as recited in claim 12, and a second cylinder, said means mounting said first cylinder mounting said second cylinder, a second piston in substantially hermetically sealed relation to and slidable in said second cylinder, second scale means mounted on said means mounting the first and second cylinders in general parallelism with said second cylinder, second start sensing electrical signal control means juxtaposed externally to said second cylinder, second stop sensing electrical signal control means juxtaposed externally to said second cylinder, said respective second sensing electrical signal control means being complemental to said second piston and actuated as a function of predetermined positioning thereof, means adjustably mounting said second stop sensing electrical signal means relative to said second scale means, second adjustable means separate from said second start sensing electrical signal control means mounted on said cylinder and supporting said second start sensing electrical signal control means at a predetermining datum relative to said second scale means, and timing means common to said first and said second cylinders selectively measuring the time of piston travel between the respective start and stop sensing electrical signal control means of either cylinder.

16. Apparatus as in claim 14, in which said cylinder is axially upwardly removable from said means mounting the cylinder and from said clamp and said start sensing electrical signal control means, and complemental means independent of said scale means and said start sensing electrical signal control means precisely relocating the latter at the datum setting after axial downward insertion of a cylinder.

17. Apparatus as in claim 16, in which said complemental means comprise a vertical standard having a lateral recess and a radially extending pin mounted on said start sensing electrical signal control means and relatively insertable in said recess.

18. Apparatus as in claim 15 in which the respective predetermined datums of the first and second start sensing electrical signal control means are in horizontal substantial alignment transverse of both of said cylinders.

References Cited in the file of this patent
UNITED STATES PATENTS

| | | |
|---|---|---|
| 1,899,764 | Machlet | Feb. 28, 1933 |
| 2,211,456 | Caldwell | Aug. 13, 1940 |
| 2,254,259 | Aller | Sept. 2, 1941 |
| 2,336,376 | Tandler et al. | Dec. 7, 1943 |
| 2,386,179 | Andrus | Oct. 9, 1945 |
| 2,772,561 | Plank et al. | Dec. 4, 1956 |
| 2,937,234 | Whitehead | May 17, 1960 |
| 3,021,703 | Pfrehm | Feb. 20, 1962 |

OTHER REFERENCES

Publication by Brooks Rotameter Co., Lansdale, Pa. Design Spec. Sheet for Calibrator Model No. 1050, 2 pp. Received by Patent Office Oct. 19, 1956. Copy in Div. 66.